(12) United States Patent
Donahey et al.

(10) Patent No.: US 11,251,476 B2
(45) Date of Patent: Feb. 15, 2022

(54) NESTED ANNULAR METAL-AIR CELL AND SYSTEMS CONTAINING SAME

(71) Applicant: FORM ENERGY, INC., Somerville, MA (US)

(72) Inventors: Glenn Donahey, Mesa, AZ (US); Ramkumar Krishnan, Scottsdale, AZ (US); Jagjot Singh Grewal, Tempe, AZ (US)

(73) Assignee: FORM ENERGY, INC., Somerville, MA (US)

( * ) Notice: Subject to any disclaimer, the term of this patent is extended or adjusted under 35 U.S.C. 154(b) by 0 days.

(21) Appl. No.: 16/868,681

(22) Filed: May 7, 2020

(65) Prior Publication Data

US 2020/0358157 A1 Nov. 12, 2020

Related U.S. Application Data

(60) Provisional application No. 62/846,110, filed on May 10, 2019.

(51) Int. Cl.
*H01M 12/08* (2006.01)
*H01M 50/107* (2021.01)
(Continued)

(52) U.S. Cl.
CPC ......... *H01M 12/08* (2013.01); *H01M 50/107* (2021.01); *H01M 50/213* (2021.01); *H01M 50/543* (2021.01)

(58) Field of Classification Search
CPC ... H01M 12/08; H01M 50/107; H01M 50/543
See application file for complete search history.

(56) References Cited

U.S. PATENT DOCUMENTS 2,083,364 A 6/1937 Cook, Jr.
3,219,486 A 11/1965 Gumucio
(Continued)

FOREIGN PATENT DOCUMENTS

DE 1266021 B 4/1968
EP 0058090 A1 8/1982
(Continued)

OTHER PUBLICATIONS

International Search Report and Written Opinion of the International Searching Authority dated Aug. 25, 2020, issued in corresponding International Application No. PCT/US2020/031760 (13 pgs).
(Continued)

*Primary Examiner* — Olatunji A Godo
(74) *Attorney, Agent, or Firm* — Pillsbury Winthrop Shaw Pittman, LLP

(57) ABSTRACT

Electrochemical metal-air cells having nested electrodes provided in an annular or cylindrical configuration, including systems that contain such cells in a sealed container. Each cell may include an oxidant electrode (air cathode) and a fuel electrode (anode), both configured in annular form. A series of permeable bodies, screens, or current collectors may be provided as part of the fuel electrode. An annular oxygen evolution electrode may also be provided in the cells. In some cases, the fuel electrode is nested within the oxidant electrode, or vice versa. Optionally, a second oxidant electrode may be included in the cells. Ionically conductive medium or electrolyte may be contained in the cell. Each cell may have its own cell housing. Optionally, an air space or pocket may be formed in a cell via an oxidant electrode. The sealed container may contain the cells such that they are surrounded by air or an electrolyte.

26 Claims, 8 Drawing Sheets

(51) Int. Cl.
*H01M 50/213* (2021.01)
*H01M 50/543* (2021.01)

(56) References Cited

U.S. PATENT DOCUMENTS

| | | | |
|---|---|---|---|
| 3,223,611 A | 12/1965 | Wells |
| 3,338,746 A | 8/1967 | Plust |
| 3,483,036 A | 12/1969 | Gregor |
| 3,489,610 A | 1/1970 | Mcclelland et al. |
| 3,525,643 A | 8/1970 | Spahrbier |
| 3,532,548 A | 10/1970 | Stachurski |
| 3,615,843 A | 10/1971 | Moran |
| 3,615,844 A | 10/1971 | Spengler |
| 3,650,837 A | 3/1972 | Palmer |
| 3,713,892 A | 1/1973 | Moran |
| 3,716,413 A | 2/1973 | Eisner |
| 3,717,505 A | 2/1973 | Unkle, Jr. |
| 3,728,244 A | 4/1973 | Cooley |
| 3,785,868 A | 1/1974 | Devitt |
| 3,801,376 A | 4/1974 | Lindstrom |
| 3,822,149 A | 7/1974 | Hale |
| 3,840,455 A | 10/1974 | Cooley et al. |
| 3,850,696 A | 11/1974 | Summers et al. |
| 3,886,426 A | 5/1975 | Daggett |
| 3,902,916 A | 9/1975 | Warszawski |
| 3,919,062 A | 11/1975 | Lundquist, Jr. et al. |
| 3,972,727 A | 8/1976 | Cohn |
| 4,007,059 A | 2/1977 | Witherspoon et al. |
| 4,119,772 A | 10/1978 | Peters et al. |
| 4,139,679 A | 2/1979 | Appleby et al. |
| 4,201,653 A | 5/1980 | O'Neill et al. |
| 4,312,927 A | 1/1982 | Salmon |
| 4,317,863 A | 3/1982 | Struthers |
| 4,340,449 A | 7/1982 | Srinivasan et al. |
| 4,385,101 A | 5/1983 | Catanzarite |
| 4,385,967 A | 5/1983 | Brady et al. |
| 4,447,504 A | 5/1984 | Goebel |
| 4,461,817 A | 7/1984 | Itoh et al. |
| 4,521,497 A | 6/1985 | Tamminen |
| 4,581,064 A | 4/1986 | Morrison et al. |
| 4,684,585 A | 8/1987 | Tamminen |
| 4,693,946 A | 9/1987 | Niksa et al. |
| 4,732,823 A | 3/1988 | Ito et al. |
| 4,871,627 A | 10/1989 | Strong et al. |
| 4,894,355 A | 1/1990 | Takeuchi et al. |
| 5,009,755 A | 4/1991 | Shor |
| 5,104,497 A | 4/1992 | Tetzlaff et al. |
| 5,185,218 A | 2/1993 | Brokman et al. |
| 5,190,833 A | 3/1993 | Goldstein et al. |
| 5,318,861 A | 6/1994 | Harats et al. |
| 5,376,471 A | 12/1994 | Hunter et al. |
| 5,415,949 A | 5/1995 | Stone et al. |
| 5,431,823 A | 7/1995 | Gofer |
| 5,434,020 A | 7/1995 | Cooper |
| 5,439,758 A | 8/1995 | Stone et al. |
| 5,458,988 A | 10/1995 | Putt |
| 5,567,540 A | 10/1996 | Stone et al. |
| 5,650,240 A | 7/1997 | Rogers |
| 5,652,068 A | 7/1997 | Shuster et al. |
| 5,733,667 A | 3/1998 | Golovin et al. |
| 5,850,136 A | 12/1998 | Kaneko |
| 5,935,724 A | 8/1999 | Spillman et al. |
| 5,935,728 A | 8/1999 | Spillman et al. |
| 5,938,899 A | 8/1999 | Forand |
| 5,972,531 A | 10/1999 | Kawakami |
| 5,998,967 A | 12/1999 | Umeki et al. |
| 6,014,013 A | 1/2000 | Suppanz et al. |
| 6,025,696 A | 2/2000 | Lenhart et al. |
| 6,034,506 A | 3/2000 | Hall |
| 6,046,514 A | 4/2000 | Rouillard et al. |
| 6,054,840 A | 4/2000 | Nakanishi et al. |
| 6,057,052 A | 5/2000 | Shrim et al. |
| 6,091,230 A | 7/2000 | Winzer |
| 6,127,061 A | 10/2000 | Shun et al. |
| 6,153,328 A | 11/2000 | Colborn |
| 6,162,555 A | 12/2000 | Gutierrez et al. |
| 6,165,638 A | 12/2000 | Spillman et al. |
| 6,207,037 B1 | 3/2001 | Dartnell et al. |
| 6,211,650 B1 | 4/2001 | Mumaw et al. |
| 6,265,846 B1 | 7/2001 | Flechsig et al. |
| 6,271,646 B1 | 8/2001 | Evers et al. |
| 6,277,508 B1 | 8/2001 | Reiser et al. |
| 6,312,846 B1 | 11/2001 | Marsh |
| 6,355,369 B1 | 3/2002 | Iarochenko et al. |
| 6,379,828 B1 | 4/2002 | Worth |
| 6,383,673 B1 | 5/2002 | Faris et al. |
| 6,383,675 B1 | 5/2002 | Zhong |
| 6,410,174 B1 | 6/2002 | Faris |
| 6,458,480 B1 | 10/2002 | Morris et al. |
| 6,465,638 B2 | 10/2002 | Gorman et al. |
| 6,472,093 B2 | 10/2002 | Faris et al. |
| 6,541,941 B2 | 4/2003 | Adams et al. |
| 6,544,678 B2 | 4/2003 | Faris et al. |
| 6,558,830 B2 | 5/2003 | Faris et al. |
| 6,562,494 B1 | 5/2003 | Tsai et al. |
| 6,562,504 B2 | 5/2003 | Faris et al. |
| 6,566,000 B1 | 5/2003 | Iarochenko et al. |
| 6,569,555 B1 | 5/2003 | Faris et al. |
| 6,579,637 B1 | 6/2003 | Savage et al. |
| 6,586,909 B1 | 7/2003 | Trepka |
| 6,641,943 B1 | 11/2003 | Faris et al. |
| 6,646,418 B1 | 11/2003 | Xie et al. |
| 6,649,294 B2 | 11/2003 | Faris et al. |
| 6,653,252 B2 | 11/2003 | Kawahara |
| 6,673,490 B2 | 1/2004 | Miki et al. |
| 6,677,077 B2 | 1/2004 | Spillman et al. |
| 6,706,433 B2 | 3/2004 | Pinto et al. |
| 6,713,206 B2 | 3/2004 | Markoski et al. |
| 6,756,149 B2 | 6/2004 | Knights et al. |
| 6,762,587 B1 | 7/2004 | Barbetta |
| 6,764,588 B2 | 7/2004 | Smedley et al. |
| 6,787,260 B2 | 9/2004 | Smedley |
| 6,802,946 B2 | 10/2004 | Basol et al. |
| 6,811,903 B2 | 11/2004 | Vartak et al. |
| 6,822,423 B2 | 11/2004 | Yau et al. |
| 6,838,203 B2 | 1/2005 | Zheng |
| 6,855,455 B1 | 2/2005 | Berger et al. |
| 6,858,347 B2 | 2/2005 | Tanigawa |
| 6,866,950 B2 | 3/2005 | Connor et al. |
| 6,902,602 B2 | 6/2005 | Keefer et al. |
| 6,911,274 B1 | 6/2005 | Colborn et al. |
| 6,942,105 B2 | 9/2005 | Smedley et al. |
| 6,967,064 B2 | 11/2005 | Haltiner, Jr. et al. |
| 6,986,964 B2 | 1/2006 | Faris |
| 7,020,355 B2 | 3/2006 | Lahann et al. |
| 7,126,310 B1 | 10/2006 | Barron |
| 7,150,933 B1 | 12/2006 | Mclean |
| 7,201,857 B2 | 4/2007 | Ovshinsky et al. |
| 7,226,676 B2 | 6/2007 | Faris et al. |
| 7,238,440 B2 | 7/2007 | Damore et al. |
| 7,252,898 B2 | 8/2007 | Markoski et al. |
| 7,270,906 B2 | 9/2007 | Haltiner, Jr. et al. |
| 7,273,541 B2 | 9/2007 | Choban et al. |
| 7,276,309 B2 | 10/2007 | Smedley et al. |
| 7,279,245 B1 | 10/2007 | Clark |
| 7,291,186 B2 | 11/2007 | Zhang |
| 7,303,835 B2 | 12/2007 | Mathias et al. |
| 7,466,104 B2 | 12/2008 | Wang et al. |
| 7,468,221 B2 | 12/2008 | LaFollette et al. |
| 7,482,081 B2 | 1/2009 | Hong |
| 7,488,547 B1 | 2/2009 | Iacovelli |
| 7,535,199 B2 | 5/2009 | Kimura et al. |
| 7,598,796 B2 | 10/2009 | Koski et al. |
| 7,670,575 B2 | 3/2010 | Jarvinen et al. |
| 7,670,705 B2 | 3/2010 | Ueda et al. |
| 7,670,724 B1 | 3/2010 | Chan et al. |
| 7,722,988 B2 | 5/2010 | Webber |
| 8,058,165 B2 | 11/2011 | Kawano et al. |
| 2001/0007725 A1 | 7/2001 | Faris et al. |
| 2002/0015871 A1 | 2/2002 | Tao et al. |
| 2002/0028372 A1 | 3/2002 | Ohlsen |
| 2002/0045075 A1 | 4/2002 | Pinto et al. |
| 2002/0076602 A1 | 6/2002 | Finkelshtain et al. |
| 2002/0098398 A1 | 6/2002 | Chen |

(56) References Cited

U.S. PATENT DOCUMENTS

| | | |
|---|---|---|
| 2002/0142203 A1 | 10/2002 | Ma et al. |
| 2003/0054217 A1 | 3/2003 | Faris |
| 2003/0077501 A1 | 4/2003 | Knights et al. |
| 2003/0099882 A1 | 5/2003 | Hampden-Smith et al. |
| 2003/0134163 A1 | 7/2003 | Markoski et al. |
| 2003/0143446 A1 | 7/2003 | Faris et al. |
| 2003/0165727 A1 | 9/2003 | Priestnall et al. |
| 2003/0190504 A1 | 10/2003 | Fisher |
| 2003/0198862 A1 | 10/2003 | Struthers |
| 2004/0005488 A1 | 1/2004 | Faris et al. |
| 2004/0023112 A1 | 2/2004 | Lin |
| 2004/0053132 A1 | 3/2004 | Smedley et al. |
| 2004/0058203 A1 | 3/2004 | Priestnall et al. |
| 2004/0058217 A1 | 3/2004 | Ohlsen et al. |
| 2004/0058226 A1 | 3/2004 | Lamarre et al. |
| 2004/0121208 A1* | 6/2004 | James ............... H01M 8/2455 429/483 |
| 2004/0146764 A1 | 7/2004 | Tsai et al. |
| 2004/0157092 A1 | 8/2004 | Kimberg et al. |
| 2004/0157101 A1 | 8/2004 | Smedley |
| 2004/0175603 A1 | 9/2004 | Yang et al. |
| 2004/0180246 A1 | 9/2004 | Smedley |
| 2004/0185323 A1 | 9/2004 | Fowler et al. |
| 2004/0185328 A1 | 9/2004 | Lin et al. |
| 2004/0225249 A1 | 11/2004 | Leonard et al. |
| 2004/0229107 A1 | 11/2004 | Smedley |
| 2004/0247969 A1 | 12/2004 | Faris et al. |
| 2005/0019634 A1 | 1/2005 | Legg |
| 2005/0019651 A1 | 1/2005 | Tsai et al. |
| 2005/0031911 A1 | 2/2005 | Venkatesan et al. |
| 2005/0084737 A1 | 4/2005 | Wine et al. |
| 2005/0123815 A1 | 6/2005 | Tsai et al. |
| 2005/0170245 A1 | 8/2005 | Vartak et al. |
| 2005/0196656 A1 | 9/2005 | Gomez |
| 2005/0208343 A1 | 9/2005 | Kim et al. |
| 2005/0233191 A1 | 10/2005 | Ushio |
| 2006/0003217 A1 | 1/2006 | Cohen et al. |
| 2006/0024551 A1 | 2/2006 | Smotkin |
| 2006/0038536 A1 | 2/2006 | Lafollette et al. |
| 2006/0076295 A1 | 4/2006 | Leonard et al. |
| 2006/0127731 A1 | 6/2006 | Faris |
| 2006/0210867 A1 | 9/2006 | Kenis et al. |
| 2006/0228622 A1 | 10/2006 | Cohen et al. |
| 2006/0234855 A1 | 10/2006 | Gorte et al. |
| 2006/0269826 A1 | 11/2006 | Katz et al. |
| 2006/0292407 A1 | 12/2006 | Gervasio et al. |
| 2007/0020496 A1 | 1/2007 | Pelton et al. |
| 2007/0048577 A1 | 3/2007 | Ringeisen et al. |
| 2007/0077491 A1 | 4/2007 | Burchardt |
| 2007/0092787 A1 | 4/2007 | Wang Chen |
| 2007/0120091 A1 | 5/2007 | Ovshinsky et al. |
| 2007/0141415 A1 | 6/2007 | Yang et al. |
| 2007/0141430 A1 | 6/2007 | Huang et al. |
| 2007/0141432 A1 | 6/2007 | Wang et al. |
| 2007/0141440 A1 | 6/2007 | Yang et al. |
| 2007/0141450 A1 | 6/2007 | Yang et al. |
| 2007/0154766 A1 | 7/2007 | Baik et al. |
| 2007/0166602 A1 | 7/2007 | Burchardt |
| 2007/0184314 A1 | 8/2007 | Kagami |
| 2007/0224500 A1 | 9/2007 | White et al. |
| 2007/0234900 A1 | 10/2007 | Soloveichik et al. |
| 2007/0237993 A1 | 10/2007 | Carlsson et al. |
| 2007/0248845 A1 | 10/2007 | Armstrong et al. |
| 2007/0248868 A1 | 10/2007 | Haltiner et al. |
| 2007/0259234 A1 | 11/2007 | Chua et al. |
| 2007/0264550 A1 | 11/2007 | Zhang et al. |
| 2007/0269695 A1 | 11/2007 | Yamazaki et al. |
| 2007/0278107 A1 | 12/2007 | Barnett et al. |
| 2007/0287034 A1 | 12/2007 | Minteer et al. |
| 2008/0008911 A1 | 1/2008 | Stroock et al. |
| 2008/0009780 A1 | 1/2008 | Leonard et al. |
| 2008/0026265 A1 | 1/2008 | Markoski et al. |
| 2008/0032170 A1 | 2/2008 | Wainright et al. |
| 2008/0044721 A1 | 2/2008 | Heller et al. |
| 2008/0145719 A1 | 6/2008 | Yang et al. |
| 2008/0145721 A1 | 6/2008 | Shapiro et al. |
| 2008/0145737 A1 | 6/2008 | Cai et al. |
| 2008/0154101 A1 | 6/2008 | Jain et al. |
| 2008/0231231 A1 | 9/2008 | Hartzog et al. |
| 2008/0241617 A1 | 10/2008 | Sato |
| 2008/0252257 A1 | 10/2008 | Sufrin-Disler et al. |
| 2008/0268341 A1 | 10/2008 | Zhang |
| 2009/0027006 A1 | 1/2009 | Vezzini et al. |
| 2009/0081488 A1 | 3/2009 | Sato et al. |
| 2009/0117429 A1 | 5/2009 | Zillmer et al. |
| 2009/0167242 A1 | 7/2009 | Naganuma et al. |
| 2009/0230921 A1 | 9/2009 | Hsu et al. |
| 2009/0286149 A1 | 11/2009 | Ci et al. |
| 2009/0305090 A1 | 12/2009 | Chuang |
| 2010/0062303 A1 | 3/2010 | Bae et al. |
| 2010/0119895 A1 | 5/2010 | Friesen |
| 2010/0285375 A1 | 11/2010 | Friesen et al. |
| 2010/0316935 A1 | 12/2010 | Friesen et al. |
| 2011/0039181 A1 | 2/2011 | Friesen et al. |
| 2011/0044528 A1 | 2/2011 | Tsuchiya et al. |
| 2011/0070506 A1 | 3/2011 | Friesen et al. |
| 2011/0086278 A1 | 4/2011 | Friesen et al. |
| 2011/0189551 A1 | 8/2011 | Friesen et al. |
| 2011/0200893 A1 | 8/2011 | Friesen et al. |
| 2011/0250512 A1 | 10/2011 | Friesen et al. |
| 2011/0305959 A1 | 12/2011 | Friesen et al. |
| 2011/0316485 A1 | 12/2011 | Krishnan et al. |
| 2012/0015264 A1 | 1/2012 | Friesen et al. |
| 2012/0068667 A1* | 3/2012 | Friesen ............... H01M 4/02 320/135 |
| 2016/0308220 A1 | 10/2016 | Qi et al. |

FOREIGN PATENT DOCUMENTS

| | | |
|---|---|---|
| EP | 0277937 A1 | 8/1988 |
| EP | 0589144 B1 | 10/1996 |
| EP | 0895528 | 2/1999 |
| EP | 1723687 A1 | 11/2006 |
| EP | 1723687 B1 | 5/2010 |
| EP | 2274781 A1 | 1/2011 |
| GB | 1286173 A | 8/1972 |
| WO | 89/05528 | 6/1989 |
| WO | 2008/058165 A2 | 5/2008 |
| WO | 2011/035176 A1 | 3/2011 |
| WO | 2011/044528 A1 | 4/2011 |
| WO | 2011/163553 A1 | 12/2011 |
| WO | 2012/012364 A1 | 1/2012 |

OTHER PUBLICATIONS

Zheng Jia et al., "Rotating Ring-Disk Electrode Method", School of Chemical Engineering and Technology, Harbin Institute of Technology, Harbin China, Dec. 31, 2014, XP009522170, pp. 199-229.
Thirsk (Electrochemistry vol. 4 p. 16, Thirsk, ed. The Chemical Society Great Britain Oxford Alden Press 1974).
Jorne et al. (Journal of the Electrochemical Society vol. 134 No. 6, pp. 1399-1402).
Kamil S. Salloum et al., Sequential flow membraneless microfluidic fuel cell with porous electrodes, Journal of Power Sources 180, 2008, pp. 243-252.
International Search Report for PCT International Patent Application No. PCT/US2009/039460, dated May 26, 2009.
International Search Report for PCT International Patent Application No. PCT/US2009/040658, dated Aug. 24, 2009.
Stuart I. Smedley et al., "A regenerative zinc-air fuel cell", Journal of Power Sources, vol. 165, 2007, pp. 897-904.
N.J. Cherepy et al., "A Zinc/Air Fuel Cell for Electric Vehicles", IEEE publication, 1999, pp. 11-13.
International Preliminary Report on Patentability (Chapter 1 of the Patent Cooperation Treaty) for International Application No. PCT/US2009/040658 dated Dec. 2, 2010.
Cohen et al., "Fabrication and preliminary testing of a planar membraneless microchannel fuel cell," J. Power Sources, 2005, 139, 96-105.
Ferrigno et al., "Membraneless Vanadium Redox Fuel Cell Using Laminar Flow," J. Am. Chem. Soc. 2002, 124, pp. 12930-12931.

(56) References Cited

OTHER PUBLICATIONS

Jayashree et al., "Air-Breathing Laminar Flow-Based Microfluidic Fuel Cell", J. Am. Chem. Soc., 2005, 127, pp. 16758-16759.
Jorne et al. (Journal of the Electrochemical Society vol. 134 No. 6, pp. 1399-1402 (Jun. 1987).
Smedley et al., "A regenerative zinc-air fuel cell," Journal of Power Sources, vol. 165, 2007, pp. 897-904.
Ross, P. N. et al., "Feasibility Study of a New Zinc-Air Battery Concept Using Flowing Alkaline Electrolyte", Intersociety Energy Cony. Eng. Cont, vol. 2, pp. 1066-172 (Aug. 25, 1986).
Suppl. European Search Report of EP Appl No. 09751078.8 dated Jul. 27, 2012 (6 pages).
Office Action dated Jan. 13, 2012 issued in corresponding Chinese Patent Application No. 201120307185.2 w/English translation (9 pgs.).
International Preliminary Report on Patentability dated Nov. 25, 2021, issued in corresponding International Application No. PCT/US2020/031760 (7 pgs ).

\* cited by examiner

NESTED ANNULAR METAL-AIR CELL AND SYSTEMS CONTAINING SAME

CROSS REFERENCE TO RELATED APPLICATION

This patent application claims priority to U.S. provisional patent application no. 62/846,110 filed on May 10, 2019, which is incorporated by reference herein in its entirety.

BACKGROUND

Field

The present disclosure is generally related to electrochemical metal-air cells having nested electrodes provided in an annular configuration, and systems that contain such cells.

Description of Related Art

Metal-air cells typically include a fuel electrode at which metal fuel is oxidized, an oxidant electrode at which an oxidant (i.e., oxygen from the air) is reduced, and an ionically conductive medium therebetween for providing ion conductivity between the fuel and oxidant electrodes. In some embodiments of metal-air cells, or other cells utilizing an oxidant, a wound, rolled, folded, or otherwise compacted configuration may be utilized for enhancing cell space management and arrangement. In some such cells, multiple layers are formed that include the fuel electrode, the oxidant electrode, and the ionically conductive medium. Examples of such cells are disclosed in U.S. Pat. Nos. 8,309,259 and 8,895,197, the entireties of each of which are incorporated herein by reference.

SUMMARY

It is an aspect of this disclosure to provide an electrochemical cell including: an oxidant electrode for absorbing gaseous oxidant and a fuel electrode for receiving a metal fuel. The oxidant electrode has one or more active materials for reducing the gaseous oxidant. The cell also includes a liquid ionically conductive medium, that is contained by the oxidant electrode, for conducting ions for supporting electrochemical reactions at the fuel electrode and the oxidant electrode. The oxidant electrode and the fuel electrode are each configured in annular form, and the fuel electrode and the oxidant electrode are nested in the cell.

Another aspect provides a system including a sealed container and a plurality of electrochemical cells. Each cell includes: an oxidant electrode for absorbing gaseous oxidant and a fuel electrode for oxidizing a metal fuel. The oxidant electrode has one or more active materials for reducing the gaseous oxidant. The oxidant electrode and the fuel electrode are each configured in annular form, and the oxidant electrode and the fuel electrode are nested. Also included in the system is a liquid ionically conductive medium for conducting ions for supporting electrochemical reactions at the fuel electrode and the oxidant electrode. The sealed container contains the plurality of electrochemical cells therein.

Other features and advantages of the present disclosure will become apparent from the following detailed description, the accompanying drawings, and the appended claims.

DETAILED DESCRIPTION OF THE PREFERRED EMBODIMENT(S)

Generally described herein are electrochemical metal-air cells having nested electrodes provided in an annular or a cylindrical configuration. Systems that contain such cells in a container are also provided. Each cell may include an oxidant electrode (e.g., an air cathode) and a fuel electrode (e.g., an anode). A series of permeable bodies, screens, or current collectors may be provided as part of the fuel electrode. An oxygen evolution (or oxygen evolving) electrode may also be provided in the cells, e.g., to act as a charging electrode. The fuel electrode may be nested within the oxidant electrode, or vice versa. Optionally, in some embodiments, a second oxidant electrode may be included in the cell(s). An ionically conductive medium or electrolyte may be contained in the cell. Each cell may optionally have its own cell housing, formed by either the air cathode itself or an external housing. Optionally, an air space or pocket may be formed in a cell via an oxidant electrode. The container may contain the cells such that they are surrounded by air or a liquid ionically conductive medium/electrolyte. The container may include a compartment that is sealed (e.g., via a lid or a cover) to contain the cells therein. Additional features shall be understood by the Figures and description of embodiments provided below.

The term first electrode is used interchangeably with fuel electrode and/or anode in this disclosure. The term second electrode is used interchangeably with oxidant electrode. The term oxidant electrode is used interchangeably with oxidant electrode, oxidant reducing electrode, oxidant reduction electrode, air electrode, and/or air cathode. The first and second electrodes are electrodes of opposite polarity, e.g., the first electrode has an anodic potential to oxide its active reactant during standard discharge and a cathodic potential to reduce an oxidized species back to the active reactant during standard charge, and the second electrode does the opposite on its active reactant. The term ionically conductive medium may refer to an electrolyte, i.e., ionically conductive liquid electrolyte, liquid ionically conductive medium, and/or an aqueous ionically conductive medium, and such terms may be used interchangeably throughout this disclosure.

Figure 1A:
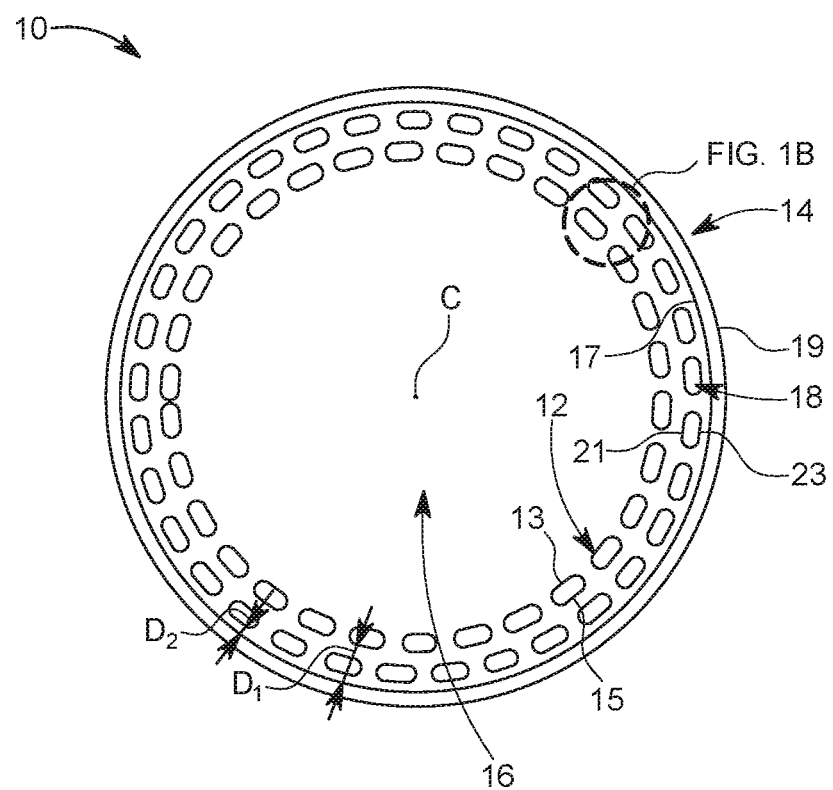
FIG. 1A is a schematic overhead view of an electrochemical metal-air cell in accordance with an embodiment of this disclosure.

FIG. 1A is a schematic overhead view of an electrochemical metal-air cell 10 in accordance with an embodiment of this disclosure. Generally, the cell 10 includes at least a first electrode 12 and a second electrode 14. In accordance with embodiments herein, the first electrode(s) is a fuel electrode 12 for receiving and oxidizing a metal fuel, and the second electrode 14 is an oxidant electrode 14 (or oxidant reduction electrode) that has one or more active materials for reducing a gas oxidant (e.g., oxygen in air). In an embodiment, e.g., during standard discharge, the fuel electrode 12 acts or functions as an anode where the fuel of the cell or system is oxidized so that electrons given off by the metal fuel, as the fuel is oxidized at the fuel electrode 12, flows to an external load L, and the oxidant electrode 14 acts or functions as an air cathode for absorbing and reducing gaseous oxidant (e.g., oxygen in air) and is configured to receive electrons from the external load L. In accordance with an embodiment, the fuel electrode 12 of each cell 10 has fuel in the form of solid fuel electrodeposited on an electroconductive electrode body, but may be generally referred to as the anode, even when no fuel is present. Further, in the cell 10 of FIG. 1A an ionically conductive medium 16 is contained by the oxidant electrode 14, for conducting ions for supporting electrochemical reactions at the fuel electrode(s) 12 and the oxidant electrode 14.

The fuel electrode 12 includes an internal surface 13 that faces the ionically conductive medium 16 and an external surface 15 that faces the oxidant electrode 14. The oxidant electrode 14 includes an internal surface 17 or cell side or face (e.g., facing and contacting electrolyte or ionically conductive medium 16 within the cell 10) that faces the fuel electrode 12 and an external surface 19, or air side or face, that is facing and exposed to oxidant (oxygen or air). In some embodiments, as illustrated in FIG. 1A, the external surface 19 of the oxidant electrode 14 may be an outermost surface of the cell 10.

More specifically, as shown, the oxidant electrode 14 and the fuel electrode 12 are each configured in annular form in the cell 10. In this disclosure, an "annular" configuration is meant to encompass shapes that are integral and continuous, such as a tubular cylinder or a shape with an ovular cross-section. An annular configuration excludes wound, spiral configurations with one or more open ends, but includes configurations having ends that are joined, e.g., by a seam, to form a continuous shape. For example, a square or rectangular shape of material may be rolled such that its ends may be bonded or sealed together, and thus provide an annular form.

In accordance with one embodiment, the fuel electrode 12 is nested within the oxidant electrode 14. In another embodiment, the oxidant electrode 14 is nested within the fuel electrode 12. Throughout this disclosure, the term "nested" refers to an electrode/object being placed or stored one inside the other; e.g., in FIG. 1A, the fuel electrode 12 is arranged in a hierarchical structure from a center C of the cell 10 such that it is provided inside the oxidant electrode 14, i.e., the fuel electrode is nested within the oxidant electrode 14. In this exemplary illustrated embodiment, an outer wall of the cell 10 is constituted by the oxidant electrode 14. Accordingly, the oxidant electrode 14 forms the primary housing structure for the cell 10. In this configuration, the cell 10 may function in ambient conditions, with no need for active air control. The oxidant electrode 14 and the fuel electrode 12 are spaced apart to form a gap or distance D1 therebetween.

Figure 1B:
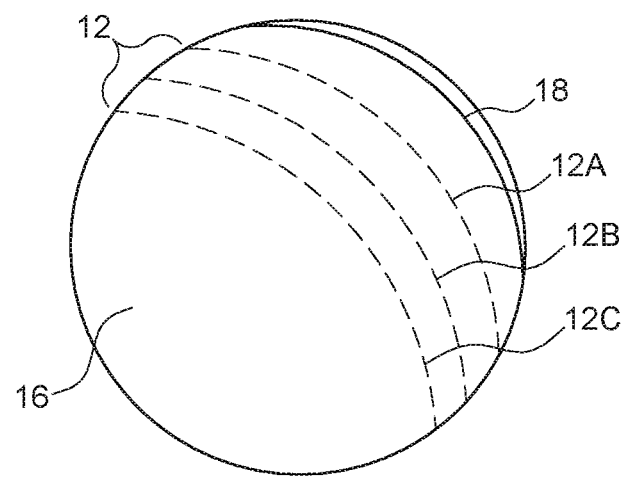
FIG. 1B is a detailed view of a portion of the cell of FIG. 1A.

In some embodiments, the first electrode or the second electrode of the electrochemical cell 10 may be provided by configurations other than a single electrode. In the non-limiting embodiment illustrated in cell 10, for example, in some embodiments, the first or fuel electrode 12 for each cell may be provided by smaller, separate, and individual bodies instead of a larger, single electrode (single anode body). In an embodiment, the first or fuel electrode 12 may include a series of permeable bodies, e.g., bodies 12A, 12B, 12C . . . 12n, as shown in the detail of FIG. 1B. Each of the permeable bodies 12A, 12B, and 12C in the series are configured in annular form. In one embodiment, each of the permeable bodies 12A, 12B, and 12C are nested within the oxidant electrode 14. Each permeable body 12A, 12B, 12C . . . 12n may be spaced apart relative to an adjacent permeable body. This enables fuel/metal growth on each permeable body and the metal growth may establish connections between the bodies 12A, 12B, 12C, etc. Further, using two or more anode bodies may help manage maintenance of the cell to avoid out of service time, for example. While three permeable bodies are illustrated in FIG. 1B as being part of the fuel electrode 12, it should be understood to one of ordinary skill in the art that this number is not intended to be limiting. In accordance with embodiments, two or more permeable bodies may be provided in cell 10. In accordance with one embodiment, the permeable bodies 12A . . . 12n may be current collectors or screens plated with a metal (e.g., zinc) and spaced apart from one another. The fuel electrode 12 or anode, and/or its permeable bodies 12A . . . 12n (if provided) may be a woven screen, a perforated metal sheet, or an expanded metal screen, for example, and may be corrugated or pleated. Thus, the use of a single fuel electrode/anode in the cell is not intended to be limiting.

In other embodiments, the oxidant electrode 14 for each cell may be provided by smaller, separate, and individual cathodes (or cathode bodies) instead of a larger, single cathode. That is, similar to the bodies described above with reference to fuel electrode 12, the oxidant electrode 14 may include two or more bodies provided in series. Additionally and/or alternatively, in another embodiment, more than one oxidant electrode may be provided in a cell (an example of which is discussed later with reference to FIG. 3). Thus, the use of a single oxidant electrode/air cathode in the cell is not intended to be limiting.

In addition to fuel electrode 12 and oxidant electrode 14, cell 10 may include a charging electrode 18. According to an embodiment, the charging electrode is an oxygen evolution electrode 18 (or oxygen evolving electrode), also referred to herein as OEE 18. The OEE 18 may also have an annular shape or form geometrically similar to the fuel electrode 12 and the oxidant electrode 14. The OEE 18 may be nested within the oxidant electrode 14, in accordance with an embodiment. As shown in FIG. 1A, in one embodiment, the oxygen evolution electrode 18 is provided between the fuel electrode 12 and the oxidant electrode 14. The fuel electrode 12 and OEE 18 may be immersed in the ionically conductive medium 16. The OEE 18 includes an internal surface 21 that faces the fuel electrode 12 and an external surface 23 that faces the oxidant electrode 14. The OEE 18 and the oxidant electrode 14 may be spaced apart by a distance D2.

The OEE 18 is configured to evolve oxygen for the purpose of creating mixing or circulation of the electrolyte due to convection driven by rising oxygen bubbles in the ionically conductive medium 16/liquid electrolyte between the electrodes. By immersing the OEE 18 and positioning it between fuel electrode 12 and oxidant electrode 14, oxygen in bubbles that are produced by the oxygen evolving electrode 18 rises up in the electrolyte 16 and in-between the surfaces 15 and 17 of the electrodes 12 and 14 (respectively) in the electrode assembly to circulate the electrolyte and prevent stratification. More specifically, oxygen bubbles are created on the OEE 18 by oxidation of hydroxide ions to oxygen gas, countered by the reduction of oxygen gas from air at the air cathode or oxidant reducing electrode 14 (which reduced oxygen may form, e.g., hydroxide ions in the electrolyte solution). That is, the electrodes 14 and 18 are electrically coupled together with an anodic potential at the electrode 18 and a cathodic potential at the electrode 14.

Collectively, the fuel electrode 12, OEE 18, and oxidant electrode 14 may be referred to as an electrode assembly of the cell 10.

Generally, a controller or circuit is used to control the modes and operation of the cell, as described in greater detail below. In the case of utilizing the oxygen evolving electrode 18, for example, the controller is configured to apply an external voltage (potential) or current source between the oxidant electrode 14 and the OEE 18 to provide a driving force for oxygen reduction on the oxidant electrode 14 and oxygen evolution on the OEE 18.

There are many permutations of OEE and anode electrode assemblies that can function within the annular air cathode "container" for specific cycling purposes. Accordingly, it should be understood by one of ordinary skill in the art that the features and illustrations as described herein are not intended to be limiting. Additional features regarding the electrodes of the cells are further described later.

When a cell 10 comprises a fuel electrode 12 with multiple permeable bodies (i.e., 12A, 12B . . . 12n), the oxygen evolution electrode 18 may be provided between the oxidant electrode 14 and a first permeable body in the series. The first permeable body of the fuel electrode 12 is defined as the permeable body that is closest to the oxidant electrode 14 in the series when the series of permeable bodies is nested within the oxidant electrode 14. In this illustrative case of FIG. 1A-1B, the first permeable body of the fuel electrode 12 is body 12A, and the OEE 18 is provided between permeable body 12A and the oxidant electrode 14.

Figure 1C:
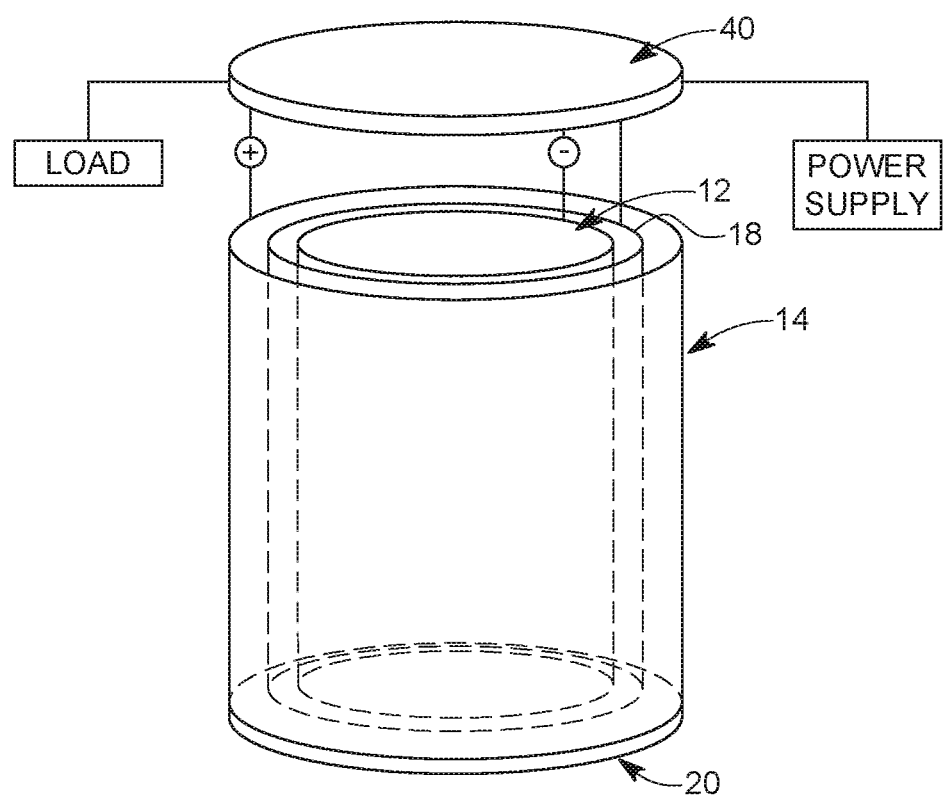
FIG. 1C is a schematic perspective view of the cell of FIG. 1A.

A top portion (or "top") 40 or cover and/or a bottom portion 20 (or "bottom") may be provided as part of the cell 10, which are generally depicted in FIG. 1C. In accordance with an embodiment, the top 40 and/or bottom 20 may be provided in the form of a retainer or a cap. In one embodiment, the top 40 and/or bottom 20 may include a plastic or molded cap that is placed on either ends of the annular electrode assembly. In addition to holding the electrodes in place, the top 40 and/or bottom 20 of the cell 10 may be used to provide an electrical connection from the cell assembly to a power supply PS, a load L, or other cell assemblies, using electrical leads or terminals. In an embodiment, the top 40 and/or bottom 20 may include electrode terminals for connecting each first/fuel electrode 12, OEE 18, and each second/oxidant electrode 14. The cell terminals may be referred to in conventional nomenclature as the negative and positive terminals, denoting their usage during standard discharging. However, it should be understood that the polarity may be reversed when current is applied thereto for charging operations, and thus reference to the negative and positive terminals is not intended to be limiting for all operational modes. In an embodiment, a negative terminal may be provided at one end of the cell and a positive terminal may be provided at an opposite end of the cell. In one embodiment, the bottom 20 of a cell 10 may be used to electrically connect the oxidant electrode 14 and the top 40 of the cell 10 may be used to electrically connect the fuel electrode 12 or anode and OEE 18, or vice versa. In another embodiment, the anode 12 and cathode 14 may be connected to the top 40. In an embodiment, one or more bus bars may be contained in the top 40 and/or bottom 20 to connect all the electrodes (12, 14, 18) together for collection or application of current from their respective terminals. For example, the fuel electrodes 12 (and optionally OEEs 18) may be attached to a first bus bar and the oxidant electrodes 14 may be attached to a separate, second bus bar. The bus bar for the fuel electrodes 12 may be connected directly or indirectly to a negative terminal and the bus bar for the oxidant electrodes 14 may be connected directly or indirectly to a positive terminal.

The above noted embodiments and exemplary features are not intended to be limiting with regards to the top 40, bottom 20, and features of the cell 10. In an embodiment, the top 40 and bottom 20 may be plastic caps which may be attached to the electrode assembly(ies), e.g., with potting epoxy. Plastic injection overmolding could also be used for any of the electrodes. In another embodiment, the anode 12 and OEE 18 could also be captured in a metal housing utilizing a rubber or thermoplastic insulator to prevent electrolyte transmission to the respective terminals.

Figure 2A:
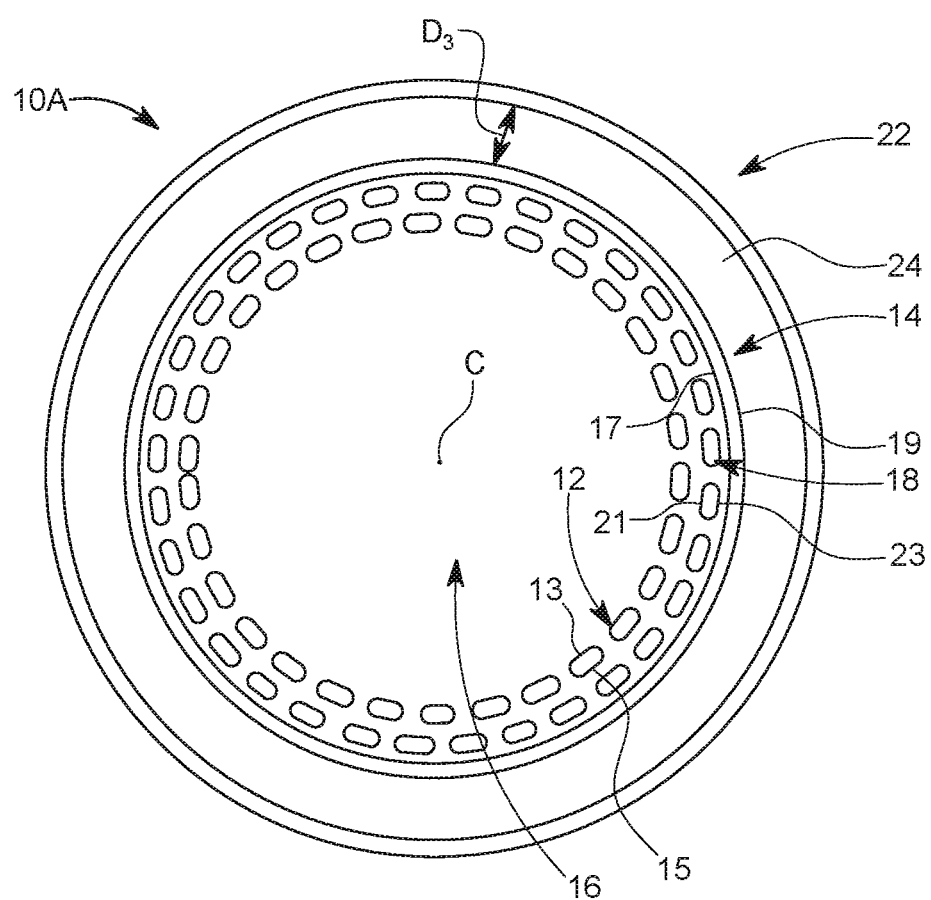
FIG. 2A is a schematic overhead view of another electrochemical metal-air cell in accordance with another embodiment of this disclosure.
Figure 2B:
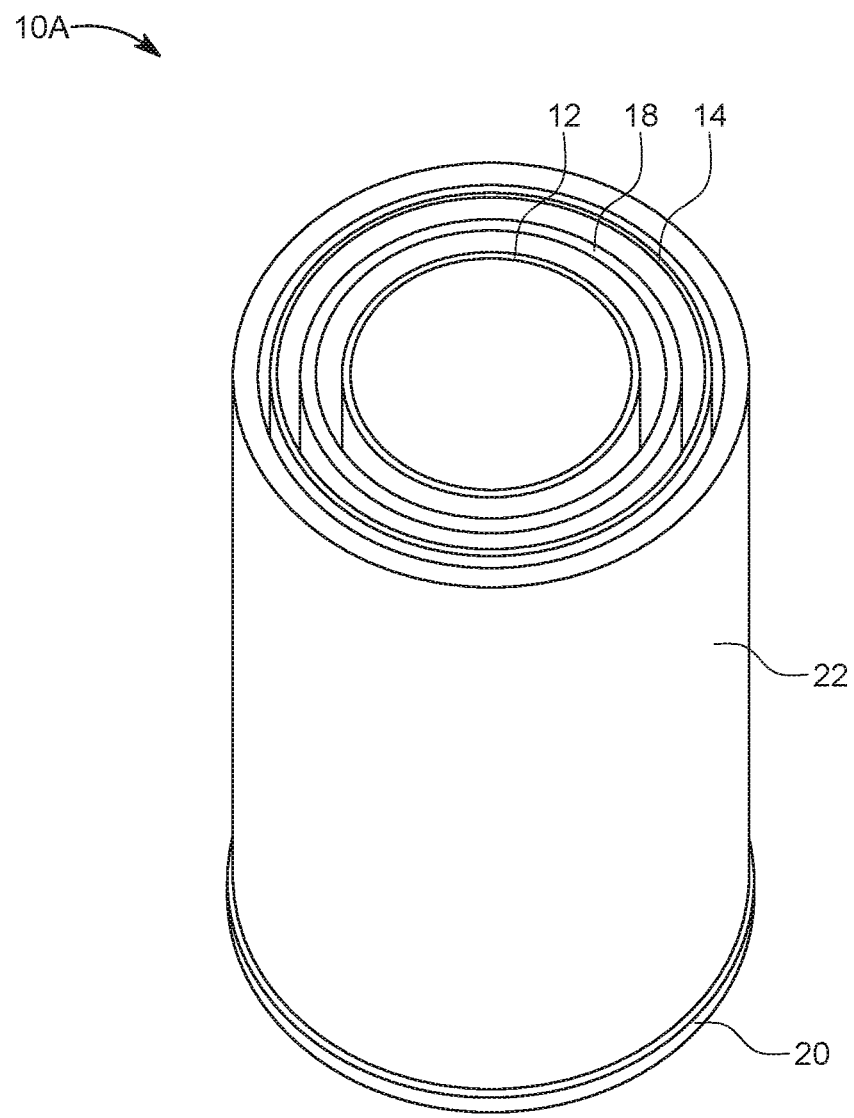
FIG. 2B is a schematic perspective view of the cell of FIG. 2A.

FIG. 2A is a schematic overhead view of an electrochemical metal-air cell 10A in accordance with another embodiment; FIG. 2B shows a perspective view of this cell 10A. Cell 10A includes several features as previously described with respect to cell 10. For purposes of clarity and brevity, like elements and components throughout all of the Figures are labeled with same designations and numbering as discussed with reference to FIGS. 1A-1C, for example. Thus, although not discussed entirely in detail herein, one of ordinary skill in the art should understand that various features associated with the cells and systems described throughout the Figures are similar to those features previously discussed. Additionally, it should be understood that the features shown in each of the individual figures is not meant to be limited solely to the illustrated embodiments. That is, the features described throughout this disclosure may be interchanged and/or used with other embodiments than those they are shown and/or described with reference to.

Cell 10A of FIGS. 2A-2B includes at least first and second electrodes, i.e., an oxidant electrode 14 and a fuel electrode 12, both of annular configuration. The fuel electrode 12 is nested within the oxidant electrode 14, much like the configuration of FIG. 1. Also, ionically conductive medium 16 is contained by the oxidant electrode 14, for conducting ions for supporting electrochemical reactions at the fuel electrode(s) 12 and the oxidant electrode 14. Further, in an embodiment, cell 10A may include an oxygen evolution electrode 18. The oxygen evolution electrode 18 may have an annular shape or form geometrically similar to the fuel electrode 12 and the oxidant electrode 14. The OEE 18 may be nested within the oxidant electrode 14, in accordance with an embodiment. The fuel electrode 12 and OEE 18 may be immersed in the ionically conductive medium 16. As shown in FIG. 1, in one embodiment, the oxygen evolution electrode 18 is provided between the fuel electrode 12 and the oxidant electrode 14. The oxidant electrode 14 and the fuel electrode 12 may be spaced apart to form a gap or distance (D1) therebetween. The OEE 18 and the oxidant electrode 14 may be spaced apart by a distance (D2).

Optionally, the fuel electrode 12 of cell 10A may include multiple permeable bodies (i.e., 12A, 12B . . . 12n), in accordance with an embodiment.

In addition, cell 10A of FIG. 2A, 2B further includes a cell housing 22 configured to contain the oxidant electrode 14, the fuel electrode 12, and the ionically conductive medium 16 therein. In an embodiment, the cell housing 22 is an external container that is provided around the assembly of electrodes. The cell housing 22 may have any construction or configuration, and the illustrated housing 22 is not intended to be limiting. In an embodiment, the housing 22 has an annular or cylindrical configuration with an outer circumferential side wall, a top portion (not shown) and a bottom portion (not shown) to house the electrodes 12, 14, 18 therein. The side wall of the housing 22 has an internal diameter that is larger than an external diameter of the oxidant electrode 14, so that the inner wall side of the external container/cell housing 22 is spaced apart from external surface 19 of the oxidant electrode 14 by a gap, a space, or distance D3 therebetween. This distance D3 or gap provides an air space 24 between the oxidant electrode 14 and external container 22. The housing 22 may have an air flow receiving opening or channel at its top portion, bottom portion, or both, to allow air flow (ambient air) into the air space 24.

Further, the top portion and/or bottom portion of housing 22 of cell 10A may be similar to top 40 and/or bottom 20 as described above with respect to FIG. 1C, and configured to provide an electrical connection from the cell assembly to a power supply PS, a load L, or other cell assemblies, using electrical leads or terminals. Optionally, the top 40 and/or bottom 20 in cell 10A may include the air flow receiving opening or channel for inputting and/or outputting air with respect to air space 24.

Figure 3:
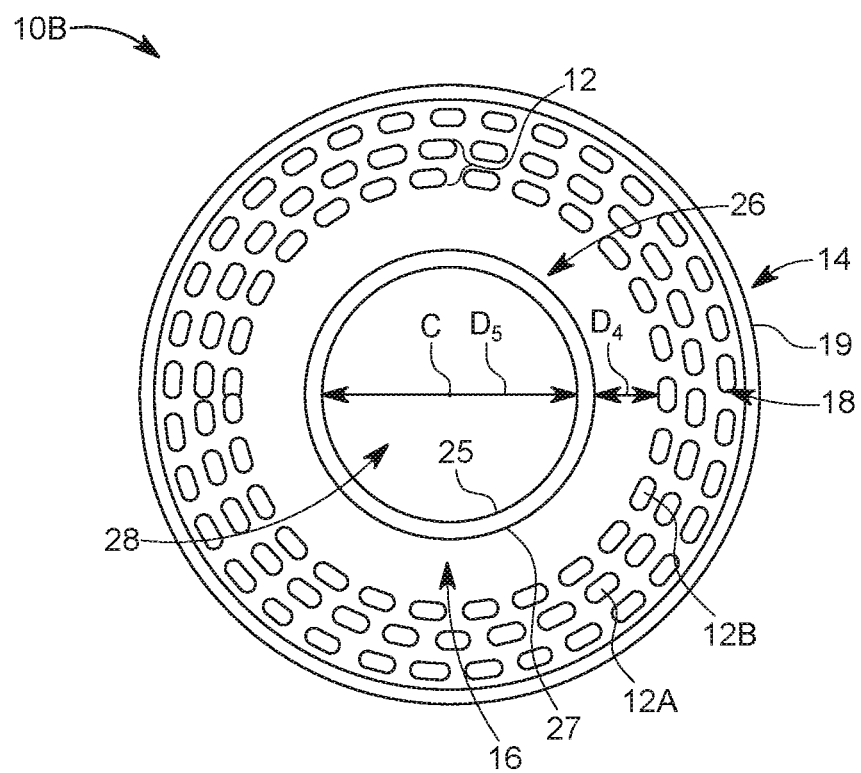
FIG. 3 is a schematic overhead view of an electrochemical metal-air cell in accordance with yet another embodiment of this disclosure.

FIG. 3 is a schematic overhead view of an electrochemical metal-air cell 10B in accordance with yet another embodiment of this disclosure. Cell 10B includes several features as previously described with respect to cell 10. For purposes of clarity and brevity, like elements and components throughout all of the Figures are labeled with same designations and numbering as discussed with reference to FIGS. 1A-1C, for example. Thus, although not discussed entirely in detail herein, one of ordinary skill in the art should understand that various features associated with the cells and systems described throughout the Figures are similar to those features previously discussed.

Cell 10B of FIG. 3 includes at least first and second electrodes, i.e., an oxidant electrode 14 and a fuel electrode 12, both of annular configuration. The fuel electrode 12 is nested within the oxidant electrode 14, much like the configuration of FIG. 1. Further, in an embodiment, cell 10A may include an oxygen evolution electrode 18. The oxygen evolution electrode 18 may have an annular shape or form geometrically similar to the fuel electrode 12 and the oxidant electrode 14. The OEE 18 may be nested within the oxidant electrode 14, in accordance with an embodiment. As shown in FIG. 1, in one embodiment, the oxygen evolution electrode 18 is provided between the fuel electrode 12 and the oxidant electrode 14. The oxidant electrode 14 and the fuel electrode 12 may be spaced apart to form a gap or distance (D1) therebetween. The OEE 18 and the oxidant electrode 14 may be spaced apart by a distance (D2).

Optionally, the fuel electrode 12 of cell 10A may include multiple permeable bodies (i.e., 12A, 12B . . . 12n), in accordance with an embodiment. For example, FIG. 3 shows first and second anode/permeable bodies 12A and 12B provided as part of fuel electrode 12, in accordance with one embodiment. These bodies 12A and 12B may be screens or sheets, for example, provided in an essentially cylindrical configuration. As noted previously, using two or more anode bodies may help manage maintenance of the cell to avoid out of service time, for example.

Cell 10B of FIG. 3 further includes an additional oxidant electrode 26. More specifically, in the configuration of FIG. 3, the oxidant electrode 14 is a first oxidant electrode, and a second oxidant electrode 26 is nested within the electrode assembly. The second oxidant electrode 26 may be provided as an "inner" electrode of the electrode assembly, such that it is arranged in hierarchical structure to be closer to a center C of the cell 10 relative to the other electrodes 12, 14, and 18. The first oxidant electrode 14 acts as an "outer electrode" with respect to the inner, second oxidant electrode 26, resulting in the donut-like configuration shown in FIG. 3, when viewed from the top of the cell, for example. The second oxidant electrode 26 may be configured in annular form and nested within the fuel electrode 12.

In an embodiment, the second oxidant electrode 26 forms an inner air space 28 of diameter D5 to contain and/or receive air therein. While the size of diameter D5 is not intended to be limiting, in one exemplary embodiment, D5 may be at least approximately fifty millimeters (50 mm) smaller in diameter in relation to an inner diameter of the outer air cathode/oxidant electrode 14. In an embodiment, the minimum diameter D5 of second oxidant electrode 26 is approximately seventy-five millimeters (75 mm).

More specifically, the second oxidant electrode 26 includes an internal surface 25 that faces a center C of the cell 10B and is exposed to air within the air space 28, as well as an external surface 27 that faces the ionically conductive medium 16 and fuel electrode 12. The internal surface 25 may be configured to receive and/or contain air (e.g., atmospheric air) therein such that second oxidant electrode 26 functions as an air cathode for absorbing and reducing gaseous oxidant (e.g., oxygen in air).

In accordance with an embodiment, the second oxidant electrode 26 and the fuel electrode 12 are spaced apart to form a gap or distance D4 therebetween. Liquid ionically conductive medium 16 is contained between the first oxidant electrode 14 and the second oxidant electrode 26, for conducting ions for supporting electrochemical reactions at the fuel electrode(s) 12 and the oxidant electrode 14 of the electrode assembly provided therebetween. The fuel electrode 12 and OEE 18 may be immersed in the ionically conductive medium 16.

This second oxidant electrode 26 as added to the cell 10B further increases the air cathode surface area, while reducing the volume of ionically conductive medium 16 therein. This significantly increases the C-rate (i.e., the battery's current handling capability, or the constant current charge rate or discharge rate at which the battery/cell sustains for a particular period of time) of the cell 10B.

Although not shown, it is envisioned that, in some embodiments, cell 10B may include an external container, like housing 22 of FIG. 2A-2B, around the assembly of electrodes (e.g., surrounding first oxidant electrode 14).

Further, the top portion and/or bottom portion of cell 10B may be similar to top 40 and/or bottom 20 as described above with respect to FIG. 1C, and configured to provide an electrical connection from the cell assembly to a power supply PS, a load L, or other cell assemblies, using electrical leads or terminals. Optionally, the top 40 and/or bottom 20 in cell 10B may include the air flow receiving opening or channel for inputting and/or outputting air with respect to air space 28.

Among other things, the cells 10, 10A, and 10B as described with reference to FIGS. 1A-3 provide an oxidant electrode 14 as part of a nested set of electrodes, thereby making the air electrode 14 the largest electrode in the cell, which improves current density. Further, providing the electrodes (e.g., 12, 14, 18) in annular form avoids issues with edge effects at corners that are typical of rectangular or planar electrodes.

The measurements and/or dimensions associated with the electrodes and cells is not meant to be limited in any way. In accordance with an embodiment, cells may be sized within a range of approximately 0.5 L (Liters) to approximately 20 L (both inclusive). In another embodiment, the size of the cells may be within a range of approximately 1.0 L (Liters) to approximately 5.0 L (both inclusive). As examples only, some cell dimension targets for 1.3 L and 5 L cells are summarized in the following table:

| | Summary of prototypes | | | | |
|---|---|---|---|---|---|
| | Outside Diameter (mm) | | | Cathode Height | Cathode Thickness |
| | Cathode | OEE | Anode | (mm) | (mm) |
| 1.3 L | 110 | 100 | 85 | 140 | 1.2 |
| 5 L | 175 | 165 | 150 | 225 | 1.2 |

Again, the above dimensions are illustrative only and not intended to be limiting in any way.

Similarly, the spacing (distances D1, D2, etc.) between parts and electrodes of the illustrative cells in FIGS. 1A, 2, and 3 are not limited. Merely as an example, the chart below provided exemplary distances for D1, D2, D3, D4, and D5 as shown in FIGS. 1A-3, for a cell 10 of 5.0 L:

| Example Dimensions (mm) for FIGS. 1A, 2, 3 - Based off of 5 L option described above | | | | | |
|---|---|---|---|---|---|
| | D1 | D2 | D3 | D4 | D5 |
| FIG. 1A | 12 | 4 | | | |
| FIG. 2 | | | 2 | | |
| FIG. 3 | | | | 15 | 125 |

These dimensions are illustrative only and not intended to be limiting in any way.

Figure 4:
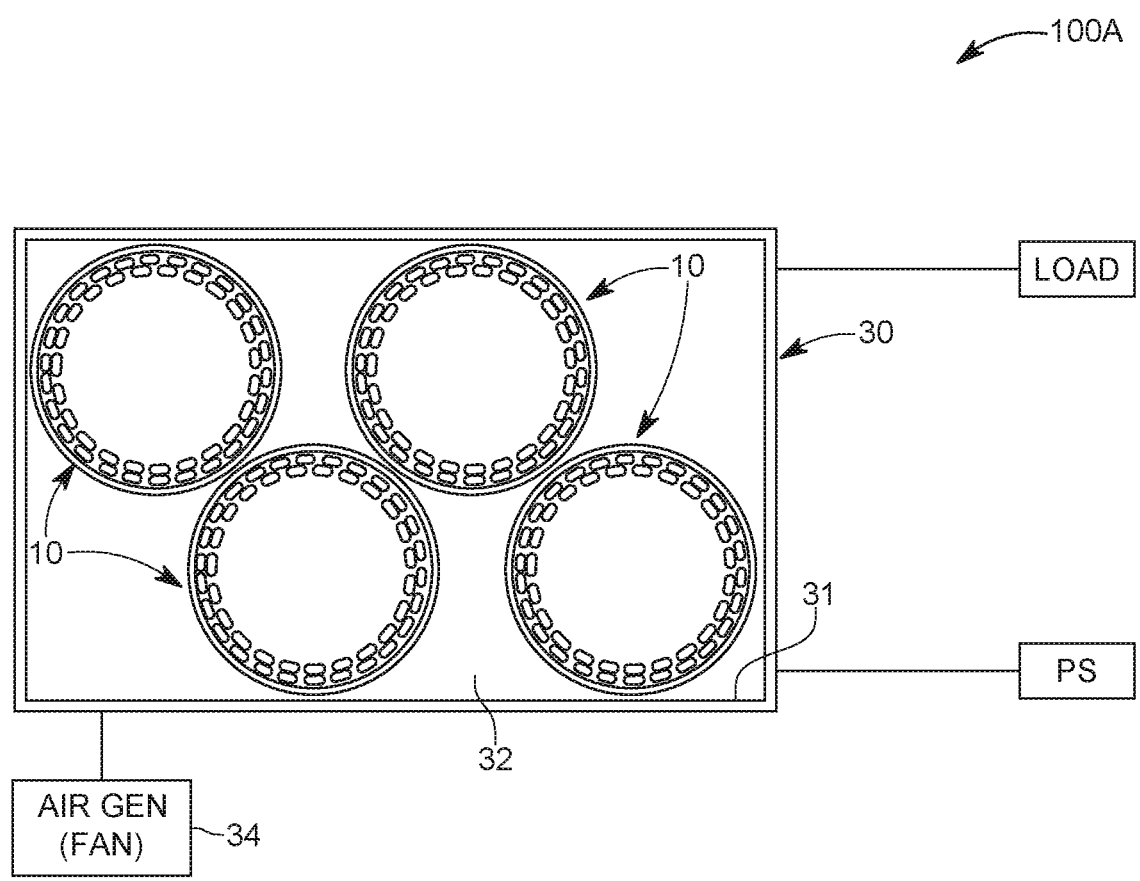
FIG. 4 is a schematic overhead view of a system containing multiple electrochemical metal-air cells in accordance with an embodiment of this disclosure.

FIG. 4 is a schematic overhead view of a system 100A containing multiple electrochemical metal-air cells (e.g., cells 10) therein, in accordance with an embodiment of this disclosure. The system 100A includes a container 30 or housing for holding and containing multiple (i.e., more than two) electrochemical cells. The container 30 includes a cell chamber 31 and may be designed to be a sealed container (e.g., via a lid or cover and any optional seals, which are described later). A liquid ionically conductive medium 16 for conducting ions for supporting electrochemical reactions at the fuel electrode 12 and the oxidant electrode 14 of the cells therein is also part of system 100A; in particular, in this illustrative embodiment, the ionically conductive medium 16 is contained within each of the cells 10 (e.g., by oxidant electrode 14). As described below, container 30 may help regulate the atmosphere and air flow to the cells 10, and may include safety features.

A multi-cell container like container 30 (which may be sealed, as described below) can be tailored to deliver a range of power and voltage options. Examples of safety features for the system 100A and/or container 30 may include fire resistant plastics (v0), electronics logic on the cell controller to bypass and cells that are underperforming. This type of container design further allows a lot of flexibility in targeting many different power/voltage/energy combinations, depending on how the cells are sized and connected (series vs parallel). In certain cases, the battery system may be tailored to output a target range of power/voltage according to a customer request.

Referring back to FIG. 4, for illustrative purposes, multiple cells 10 like those of FIG. 1A are shown in the cell chamber 31 of container 30 of system 100A. Alternatively, it should be understood that system 100A may include cells 10A or 10B in its container 30. Although a total of four electrochemical cells are illustrated in this embodiment, more or less electrochemical cells may be included in the system. Indeed, in certain applications, a large two-dimensional array of parallel electrochemical cells can be created to provide for increased power output. In other embodiments, the cells may be in series. In some embodiments, the cells may be staggered. The illustrated embodiment is not intended to be limiting in any way and is merely an example.

Figure 5:
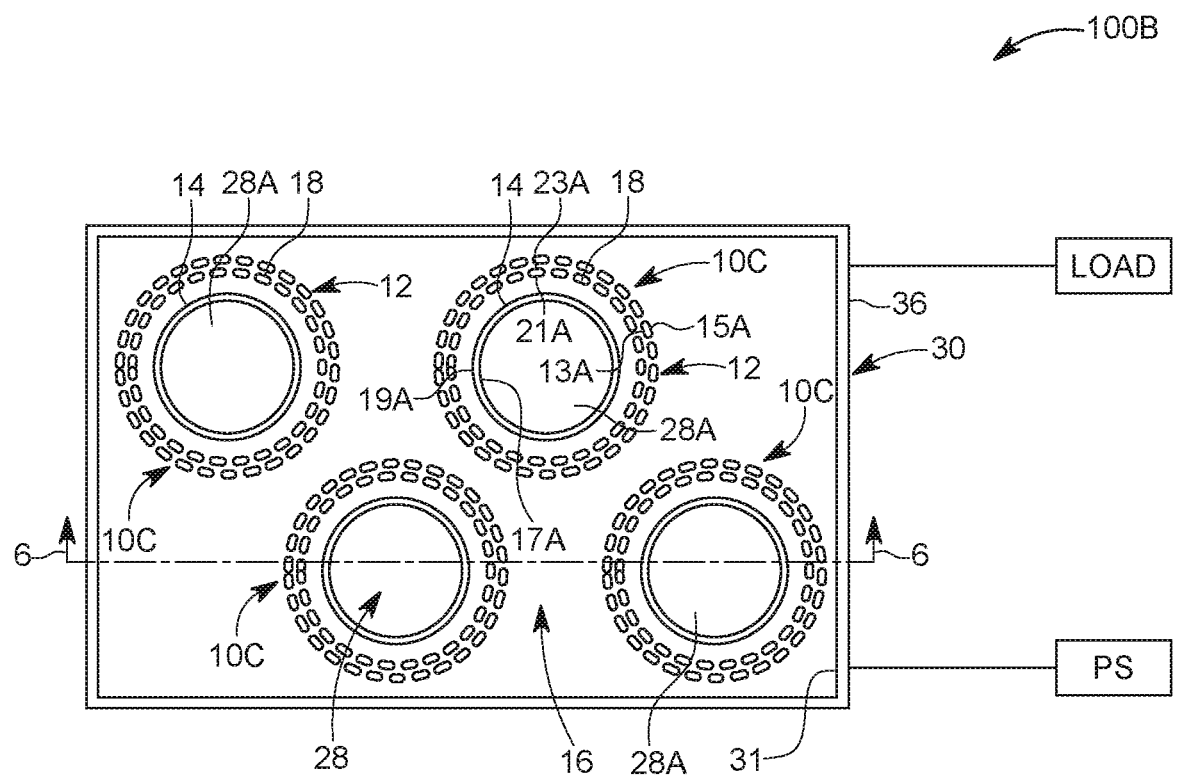
FIG. 5 is a schematic overhead view of a system containing multiple electrochemical metal-air cells in accordance with another embodiment of this disclosure.

As discussed previously, each cell 10 in system 100A includes an oxidant electrode 14 for absorbing gaseous oxidant and has one or more active materials for reducing the gaseous oxidant, a fuel electrode 12 for oxidizing a metal fuel, an OEE 18 nested therebetween the fuel electrode 12 and oxidant electrode 14 for charging the cell 10. Further, the cells 10 of system 100A have a liquid ionically conductive medium 16 for conducting ions for supporting electrochemical reactions at the fuel electrode 12 and the oxidant electrode 14. In this illustrated embodiment, the cells 10 have the liquid ionically conductive medium 16 contained by the oxidant electrode 14. As shown in FIG. 4, for example, each oxidant electrode 14 has its interior surface 17 facing and contacting the electrolyte or ionically conductive medium 16 within the cell 10, and its exterior surface 19 facing and exposed to oxygen or air in cell chamber 31. In other embodiments (such as shown in FIG. 5), the ionically conductive medium 16 may be contained by the cell chamber 31 of container 30. Again, the oxidant electrode 14, OEE 18, and the fuel electrode 12 of the cells 10 are configured in annular form. Further, each of the cells 10 have the fuel electrode 12 and OEE 18 nested within the oxidant electrode 14. The container 30 contains all of the electrochemical cells 10 therein and supports the components of the electrochemical cell system 100A.

In accordance with an embodiment, the container 30 is a sealed container. That is, container 30 may include a lid 35 (see FIG. 7), cover portion, or other device that connects to walls of a lower body of container 30, to removably, releasably, and sealingly engage the container 30 to enclose the cells 10 therein. The configuration of the container 30 and lid 35 is not intended to be limiting or limited to the exemplary depiction as shown in the drawings, including that of FIG. 7, and/or the number of cells 10 that may be contained in a container 30 and/or system 100A. Rather, the body of container 30 is designed to include at least one side wall and a bottom, like bottom 38 shown in FIG. 6. Of course, reference to surface 38 being a "bottom" is not intended to be limiting; rather, it should be understood that the system 100A may be oriented in any way. Thus, any directional references are made with regard to the orientation as shown in the drawings, and are not intended to limit a working embodiment to any particular orientation. In an embodiment, the body of the container 30 may be annular, circular, rectangular, polygonal, cylindrical or other shapes configured to include an internal cell chamber 31 for receipt of multiple cells 10 therein. One or more seals or gaskets may be optionally provided between the lid and body of container 30 to further seal the cell chamber 31. Optionally, the lid may also include one or more features, e.g., gaskets, designed to connect with and/or seal with the cells 10 such that any gases or fluids, such as an electrolyte or liquid ionically conductive medium 16 within cells 10, are prevented from leaking out of the system 100A and/or into air space 32.

In one embodiment, the cell chamber 31 of sealed container 30 contains air and forms an air space 32 therein to surround the cells 10. The container 30 may have an air flow receiving opening or channel in one or more of its walls, including its lid, to allow flow of air (ambient air) into the air space 32 of cell chamber 31. For example, the lid may include one or more openings therein to act as an oxidizer input for the electrochemical cells 10 contained therein.

The system 100A of FIG. 4 may further include an air flow generator 34 that is associated with the sealed container 30, in accordance with an embodiment. The air flow generator 34 may be configured to force atmospheric air (from outside of the container 30) into air space 32 of the sealed container 30, to deliver atmospheric air into the sealed container such that said air is delivered to external surfaces of the oxidant electrodes 14 of each of the electrochemical cells 10 contained therein.

The positioning of the air flow generator 34 relative to the container 30 is not intended to be limiting, so as long as the air is at least periodically turned over in the air space 32. In an embodiment, the generator 34 may be provided in a lid of sealed container 30. In an embodiment, the air flow generator 34 is configured to force air flow into the nested assembly of the cells 10 (e.g., between surfaces of the fuel and oxidant electrodes 12, 14). The use of an air flow generator 34 facilitates delivery of air to the external surface of the oxidant electrode 14. The air flow generator 32 may be a compressor, an electrically powered fan or impeller, a bellows, or any other device designed to generate airflow. For example, instead of generating positive pressure, a vacuum could generate negative pressure to force air flow through container 30 as well. The direction of air flow through the container 30 is also not intended to be limiting. In some embodiments, the direction of air flow may be axially through the cells 10. In another embodiment, the air flow may flow longitudinally or horizontally through the container 30.

The positioning of the cells 10 within the container 30 is also not intended to be limiting. According to one embodiment, the cells 10 may be spaced within the sealed container 30 such that centers of the cells 10 are substantially equidistantly spaced relative to one another therein. In an embodiment, spacing is provided between the cells 10, and thus the oxidant electrodes 14, to permit open air flow directly to the oxidant electrode external surface 19. In another embodiment, the external surface 19 of each oxidant electrode is exposed to oxygen/oxidant by permitting permeation of the air through a porous portion of the oxidant electrode 14.

In an embodiment, each of cells 10 in system 100A may have a fuel electrode 12 that may include a series of permeable bodies, such as previously described with reference to FIG. 1B. The series of permeable bodies in the cells 10 of system 100A may be configured in annular form, and each spaced apart relative to an adjacent permeable body. Additionally, in one embodiment, an oxygen evolution electrode 18 may be provided in the cells 10 of system 100A, such that the OEE 18 is between the oxidant electrode 14 and a first permeable body (e.g., 12A) in the series of bodies, as explained above.

Figure 6:
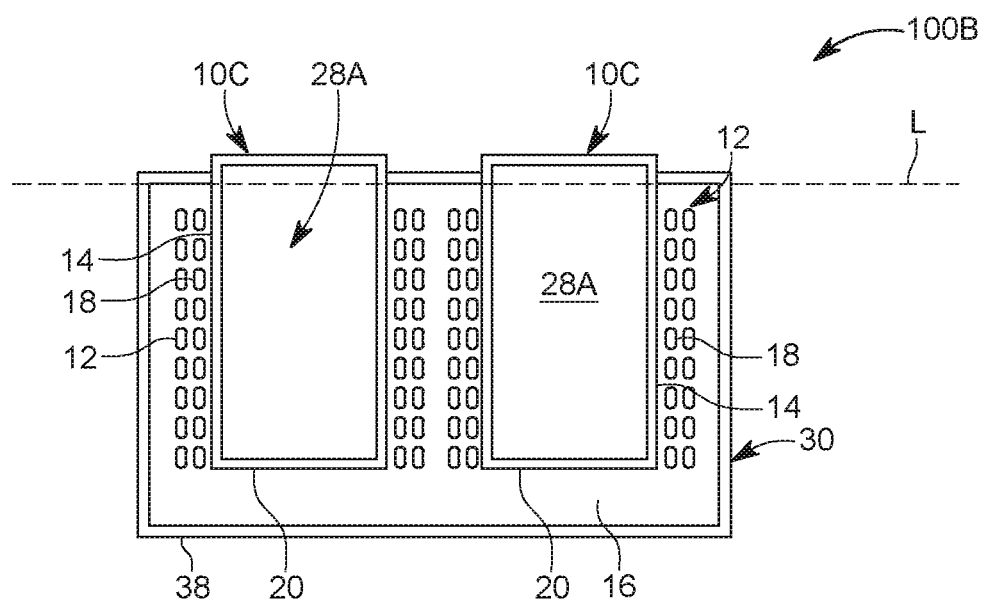
FIG. 6 is a schematic cross-sectional view taken along line 6-6 of the system of FIG. 5.
Figure 7:
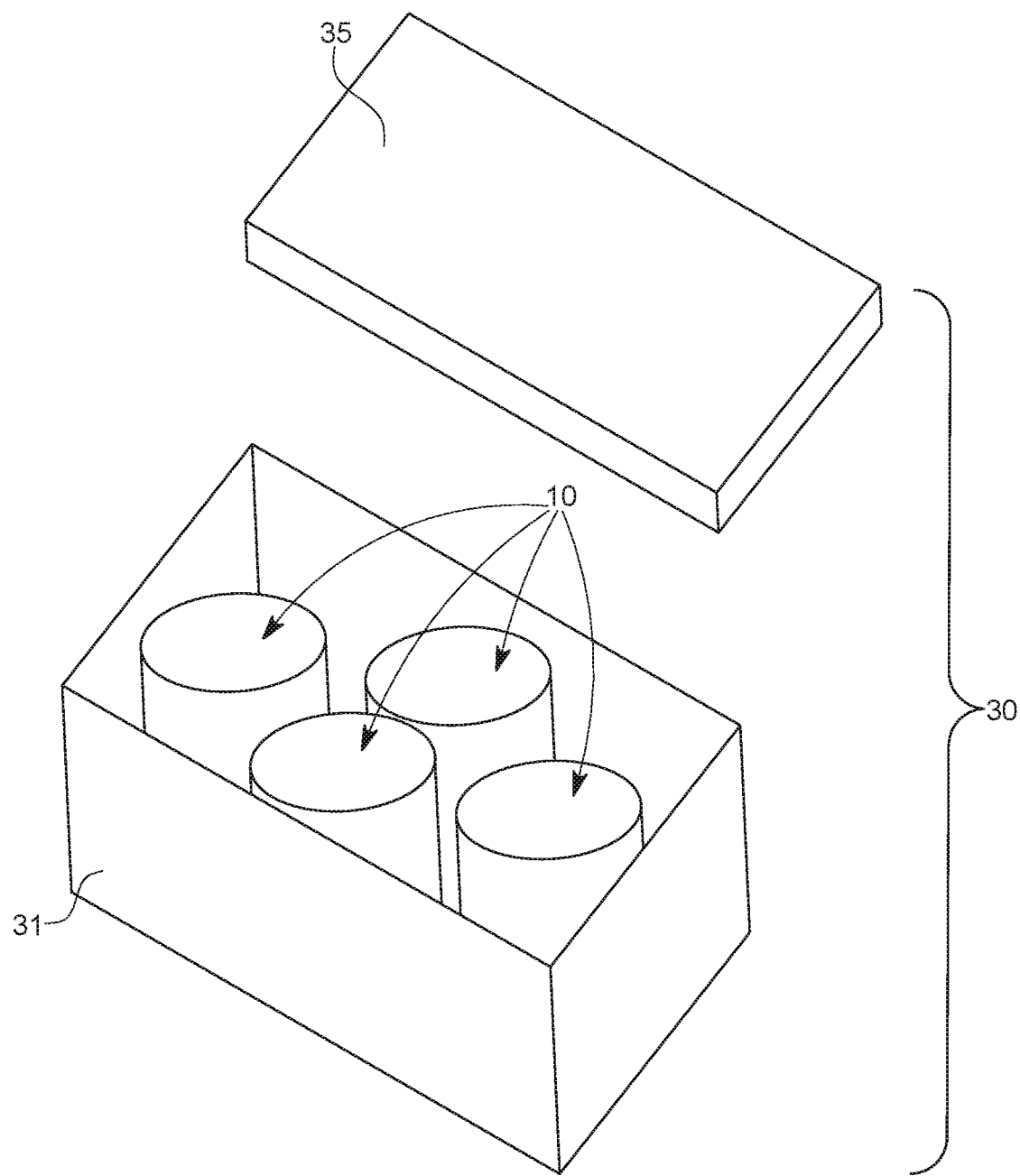
FIG. 7 is a schematic view of a system that includes a sealed container, in accordance an embodiment of this disclosure.

FIGS. 5 and 6 show another system 100B containing multiple electrochemical metal-air cells in accordance with another embodiment of this disclosure. Like system 100A, the system 100B includes a container 30 or housing that has a cell chamber 31 for holding and containing and multiple (i.e., more than two) electrochemical cells in the chamber 31. The container 30 may be a sealed container (e.g., via a lid or cover and any optional seals). The container 30 contains all of the electrochemical cells therein and supports the components of the electrochemical cell system 100A. Again, the configuration of the container 30 is not intended to be limiting or limited to the exemplary depiction as shown in the drawings. The body of the container 30 may be annular, circular, rectangular, polygonal, or other shapes configured to receive multiple cells 10 therein. One or more seals or gaskets may be optionally provided between the lid and body of container 30 to further seal the cell chamber 31. Optionally, the lid may also include one or more features, e.g., gaskets, designed to connect with and/or seal with the cells 10 such that any gases or fluids, including air in air spaces 28 of the cells 10C, are prevented from leaking out of the system 100A and/or into cell chamber 31.

A liquid ionically conductive medium 16 for conducting ions for supporting electrochemical reactions at the fuel electrode 12 and the oxidant electrode 14 of the cells therein is also part of system 100A. In this system 100B, electrochemical cells 10C are provided and contained with a volume of ionically conductive medium 16/electrolyte within the cell chamber 31 of container 30. That is, in this illustrative embodiment, the ionically conductive medium 16 is contained within the cell chamber 31, such that cells 10C are at least partially immersed in the ionically conductive medium 16. In accordance with an embodiment, the container 30 is a sealed container. That is, container 30 may include a lid (like lid 35 shown FIG. 7), cover portion, or other device that connects to walls of a lower body of container 30, to removably, releasably, and sealingly engage the container 30 to enclose the cells 10 therein. In one embodiment, the sealed container 30 contains a pool or a volume 36 of liquid ionically conductive medium 16 in an internal space of cell chamber 31, which surrounds and contacts the cells 10. The liquid ionically conductive medium 16 conducts ions for supporting electrochemical reactions at the fuel electrode 12 and the oxidant electrode 14 of each cell. A level L (see FIG. 6) of ionically conductive medium 16 in the cell chamber 31 may be adjusted based on the position of the cells 10C. For example, in some instances, the level L of ionically conductive medium is provided such that it is lower than the oxidant electrodes 14 of each cell 10C (that is, a portion of the air cathodes 14 of each cell 10C extends above the level L (out of) the ionically conductive medium), such as shown in FIG. 6. In other cases, the level L of ionically conductive medium may be at a similar height as the cells 10C. In an embodiment, the cells 10C and the entire electrode assembly may be immersed in the chamber 30 and the electrolyte 16 is provided at a level L within the cell chamber 31 such that is above the tops of the electrodes 12, 14, and 18.

Much like cells 10, which were discussed previously, each cell 10C in system 100B includes an oxidant electrode 14 for absorbing gaseous oxidant that has one or more active materials for reducing the gaseous oxidant, a fuel electrode 12 for oxidizing a metal fuel, and an OEE 18 for charging the cell 10. Again, the oxidant electrode 14, OEE 18, and the fuel electrode 12 are configured in annular form. However, in this case, the oxidant electrode 14 is arranged in a hierarchical structure from a center of the cell 10 such that it is provided inside the fuel electrode, i.e., the oxidant electrode 14 is nested within the fuel electrode 12 in each of electrochemical cells 10C. That is, the cells 10C include outward facing fuel electrodes 12 (outward facing relative to chamber 31 and/or inner walls of the container 30). The fuel electrode 12 of each cell 10C has an internal surface 13A that faces the oxidant electrode 14 and an external surface 15A that faces the volume 36 of ionically conductive medium 16 as contained in cell chamber 31. The OEE 18 of each cell 10C includes an internal surface 21A that faces the oxidant electrode 14 and an external surface 23A that faces the fuel electrode 12. The fuel electrode 12 and OEE 18 may thus be immersed in the ionically conductive medium 16. The OEE 18 and the oxidant electrode 14 may be spaced apart by a distance (D2). The fuel electrode 12 and the oxidant electrode 14 may be spaced apart by a distance (D1).

Further, in an embodiment, each oxidant electrode 14 forms an inner air space 28A, like air space 28, to contain and/or receive air therein. The oxidant electrode 14 includes an internal surface 17A, or air side or face, that is facing and exposed to oxidant (oxygen or air) and an external surface 19A, or cell side or face, facing and contacting electrolyte or ionically conductive medium 16. As similarly described above, exposure of the internal surface 17A to the air in air space 28A allows oxidant electrode 14 to function as an air cathode for absorbing and reducing gaseous oxidant (e.g., oxygen in air).

Furthermore, in one embodiment, each oxidant electrode 14 may be provided as a most internal layer of in the assembly of electrodes within each cell 10C.

Although a total of four electrochemical cells are illustrated in this embodiment of FIG. 5, more or less electrochemical cells may be included in the system. Indeed, in certain applications, a large two-dimensional array of parallel electrochemical cells can be created to provide for increased power output. In other embodiments, the cells may be in series. In some embodiments, the cells may be staggered. The illustrated embodiment is not intended to be limiting in any way and is merely an example.

According to one embodiment, such as shown in FIG. 6, the cells 10C themselves, and/or at least the oxidant electrodes 14 of the cells 10C, are at least partially suspended within the sealed container 30, such that the oxidant electrodes 14 are configured to float within the ionically conductive medium 16. In this case, float refers to positioning each of the cells 10C within the cell chamber 31 such that the electrode assembly of each cell 10C does not directly contact an inner surface of the bottom 38 of the container 30. In some embodiments, a bottom 20 of each cell 10C does not directly contact an inner surface of the bottom 38 of the container 30. Any number of structures may be utilized to position the cells 10C such that they float in the medium 16. For example, in one embodiment, support tabs may extend from an exterior surface of the bottom 20 of each cell 10C, for placement against the inner surface of bottom 38, in order to space the cells 10C therefrom and allow them to float within the ionically conductive medium 16. In another embodiment, the lid (not shown) of the container 30 may include one or more structures that connect with the cells 10C in order to suspend them within the container 30. In accordance with an embodiment, the electrode assembly 10 is configured to hang from a top (lid) of the sealed container 30 via external contacts provided by terminals. In yet another embodiment, a bracket, a barrier, a wall, or other structure may be provided in the container 30 for connecting with the cells 10C to removably secure them in place within the container 30.

Because the container 30 in the system 100B of FIG. 6 holds (liquid) ionically conductive medium 16 within its walls, the collection of cells 10C in FIG. 6 as placed into the medium 16 will naturally want to float. That is, the cells 10C are naturally buoyant to the point of forcing the cells to possibly protrude more than may be desired above the electrolyte liquid level L. In an embodiment, a lid (such as lid 35) may be used on/with the container 30 to set the proper or desired height of cells 10C in relation to the electrolyte level L. In one embodiment, the lid may contain nesting features to capture the lid/tops 40 of each cell; e.g., the lid may be include protrusions, divots, correspondingly shaped receiving openings, and/or other mechanical structures, for capturing and/or receiving the tops of the cells. These lid features could also incorporate a simple valve which may limit air access during idle periods, in some embodiments. The container may also be designed with a floating head lid, in yet another embodiment, which may allow the collection of cells 10C to float as a group up and down with the electrolyte level, e.g., as it may change over time due to evaporative losses.

In another embodiment, the bottom 20 of each of the cells 10C may be placed directly on a surface of the bottom 38 of the body of the container 30. The level of ionically conductive medium 16 in the cell chamber 31 may be provided such that a portion of the air cathodes 14 of each cell 10C extends above the level and out of the ionically conductive medium.

As previously noted, air or oxidant in the inner air space 28A of each cell 10C is accessed from the inner exposed surface 13A of the oxidant electrodes 14. Air may be provided to air space 28A in a number of ways. In one embodiment, the lid (not shown) may include an manifold assembly, in which air flows into the manifold assembly and then into the air spaces 28A of the cells 10C. In another embodiment, a head space may be provided above the fells 10C in the container 30, wherein the head space is a shared air space above the cells 10C and the level of ionically conductive medium 16 contained therein. The container 30 and/or manifold assembly may include one or more inlets and outlets therein to circulate air into the air spaces 28A of the cells.

As previously described with respect to system 100A of FIG. 4, in an embodiment, system 100B may include an air flow generator 34 that is associated with the sealed container 30 to force atmospheric air (from outside of the container 30) into air spaces 28A of the cell 10C, to deliver air to internal surfaces 17A of the oxidant electrodes 14 of each of the electrochemical cells 10C contained therein. In an embodiment, the generator 14 may be a fan provided in the lid, for example.

In an embodiment, each of cells 10C may include a fuel electrode 12 that may have a series of permeable bodies, such as previously described with reference to FIG. 1B. The series of permeable bodies in the cells 10C of system 100B may be configured in annular form, and each spaced apart relative to an adjacent permeable body. Additionally, in one embodiment, an oxygen evolution electrode 18 may be provided in the cells 10C of system 100A, such that the OEE 18 is between the oxidant electrode 14 and a first permeable body (e.g., 12A) in the series of bodies, as explained above.

As shown, the systems 100A and 100B may be designed to include individual cell sub-assemblies, which allows for individual cells that could be easily changed (switched out with another cell) and thus is configured to facilitate a long duration installed system via intermittent maintenance.

In an embodiment, the container 30 of system 100A and/or 100B may be configured to provide an electrical connection from the cells contained therein to a power supply PS, a load L, or other cell assemblies, using electrical leads or terminals. In an embodiment, the fuel electrodes 12 (and optionally OEEs 18) may be attached to a first bus bar and the oxidant electrodes 14 may be attached to a separate, second bus bar. A bus bar connects all the electrodes (12, 14, 18) together for collection or application of current from their respective terminals. The bus bar for the fuel electrodes 12 may be connected directly or indirectly to a negative terminal and the bus bar for the oxidant electrodes 14 may be connected directly or indirectly to a positive terminal. The bus bars may be contained in a cover or top part of the container 30, for example. The use of bus bars is optional, and the electrodes can be connected by other connections, either collectively together or they can each be connected individually by switches or the like.

As previously noted, there are different types of permutations of OEE and anode electrode assemblies that may function within the annular air cathode "container" for specific cycling purposes. The following description relates to different features of the electrodes provided within a cell, that may apply to cells 10, 10A, and/or 10B, as well as cells within systems 100A and/or 100B.

Fuel electrode 12—Several features of fuel electrode 12 (or electrodes 12A, 12B, ... 12n) have been previously described. As noted, fuel electrode 12 is of generally annular configuration. Fuel electrode 12 may have one or more electroconductive screens, meshes, or bodies on which the metal fuel may be deposited or otherwise collected. In some embodiments, the fuel electrode 12 may include a porous structure with a three-dimensional network of pores, a mesh screen, a plurality of mesh screens (permeable bodies) isolated from one another, or any other suitable electrode. The fuel electrode 12 may include a current collector, which may be a separate element, or the body on which the fuel is received may be electroconductive and thus also be the current collector. In embodiments, the fuel electrode 12 is laminated, bonded, or attached to a backing that provides the external surface 15 of the fuel electrode 12. In some embodiments, this backing may be liquid impermeable or essentially impermeable to the ionic liquid 16 to prevent it from permeating outwardly through the fuel electrode 12 via its external surface 15. More preferably, the backing is also impermeable to air, and particularly oxygen or other oxidant, to prevent any undesirable parasitic reaction, such as oxidant reduction in the presence of the fuel oxidation that occurs at the electrode during discharge.

The metal fuel may be of any type, and may be electrodeposited, absorbed, physically deposited, or otherwise provided on or constituting the fuel electrode 12. The fuel may be of any metal, including alloys or hydrides thereof. For example, the fuel may comprise one or more of zinc, iron, aluminum, magnesium, gallium, manganese, vanadium, lithium or any other metal. As used herein, the term metal fuel refers broadly to any fuel comprising a metal, including elemental metal, metal bonded in a molecule, metal alloys, metal hydrides, etc.

The oxidant electrode 14 generally includes a porous body covered on the outer side by a gas permeable layer through which an oxidizer may diffuse, but the electrolyte may not pass through. That is, the layer is gas permeable, but not permeable by the electrolyte (i.e., it is gas permeable but not liquid permeable). As an option, the porous body may also be covered on the inner side by a liquid permeable layer through which the electrolyte may pass through so that the electrolyte may contact the porous body. The porous body of the oxidant electrode 14 has a high surface area and comprises a catalyst material that has a high activity for an oxidizer reduction reaction.

The oxidant electrode 14 may be a passive or "breathing" cathode that is passively exposed to an oxidizer source (typically oxygen present in ambient air) and absorbs the oxidizer for consumption in the electrochemical cell reactions. That is, the oxidizer, typically oxygen, will permeate from the ambient air into the oxidant electrode 14. Thus, the oxidizer need not be actively pumped or otherwise directed to the cathode, such as via an inlet. Any part of the oxidant electrode 14 by which the oxidizer is absorbed or otherwise permeates or contacts the oxidant electrode 14 may be generically referred to as an "input." The term input may broadly encompass all ways of delivering oxidizer to the cathode (and that term may similarly be used with reference to any way of delivering fuel to the anode).

The oxidant electrode 14 may be configured to absorb air or other gaseous oxidants exposed to its external surface 19 or another constituent portion thereof in a manner described below. While in some embodiments the oxidant electrode 14 is configured to receive ambient air, contained sources of oxidants may additionally or alternatively be utilized. Thus, where used herein, air refers to any gaseous oxidant source. When air is exposed to the external surface 19, the oxidant electrode 14 is configured to absorb gaseous oxygen (or another oxidant) for reduction of the oxygen during discharge of the cell 10. Some portions of the oxidant electrode 14 may be made porous to provide gaseous oxygen diffusion from the air side of the oxidant electrode 14 to reaction sites within the oxidant electrode 14 and to provide ionic conductivity for reactants and reaction products on the side of the oxidant electrode 14 facing the ionic liquid 16. It may be appreciated that a number of configurations of the oxidant electrode 14 are possible.

The oxidant electrode 14 includes a catalyst material, such as manganese oxide, nickel, pyrolyzed cobalt, activated carbon, platinum, or any other catalyst material or mixture of materials with high oxygen reduction activity in the electrolyte for catalyzing reduction of the oxidizer. The porous body of the oxidant electrode 14 may comprise the catalyst material.

In various embodiments, any number of ionically conductive mediums may be utilized herein in the electrochemical cell 10. In some embodiments wherein the ionically conductive medium 16 comprises an ionic liquid, the ionic liquid may be of any type, including room temperature ionic liquids, and including but not limited to the examples disclosed in U.S. Pat. No. 8,895,197, the entirety of which is incorporated herein by reference.

In some embodiments, the ionically conductive medium 16 may be an aqueous electrolyte, such as potassium hydroxide dissolved in water. Any such aqueous electrolyte may be used. For example, in an embodiment, the ionically conductive medium may include sodium hydroxide. The electrolytic solution 16 in any of the herein described systems or cells may be any of: potassium hydroxide, sodium hydroxide, zinc chloride, ammonium chloride, magnesium perchlorate, and magnesium bromide.

Spacers, such as non-conductive spacers, may be provided between the first and second electrodes 12 and 14, the first and OEE electrodes 12 and 18, and/or the second and OEE electrodes 14 and 18 (e.g., to provide and maintain the distance D1 and/or D2).

In accordance with an embodiment, a flow pump for pumping the ionically conductive medium 16 into and/or through the container 30 may be associated with the system (e.g., system 100A, 100B).

While the principles of the disclosure have been made clear in the illustrative embodiments set forth above, it will be apparent to those skilled in the art that various modifications may be made to the structure, arrangement, proportion, elements, materials, and components used in the practice of the disclosure.

The principles of the present invention may be broadly applied to any electrochemical cell and system where a fuel, such as a metal fuel, is electrodeposited on the anode. Such cells may include batteries, such as metal-air batteries, for example. The Figures illustrate embodiments of various aspects of the inventions claimed. These embodiments are in no way intended to be limiting, and are intended only as examples for facilitating an understanding of the principles of the claimed inventions.

It will thus be seen that the features of this disclosure have been fully and effectively accomplished. It will be realized, however, that the foregoing preferred specific embodiments have been shown and described for the purpose of illustrating the functional and structural principles of this disclosure and are subject to change without departure from such principles. Therefore, this disclosure includes all modifications encompassed within the spirit and scope of the following claims.

What is claimed is:

1. An electrochemical metal-air cell comprising:
   an oxidant electrode for absorbing gaseous oxidant and comprising one or more active materials for reducing the gaseous oxidant,
   a metal fuel electrode comprising a solid metal fuel for oxidation, and
   a liquid ionically conductive medium, that is contained by the oxidant electrode, for conducting ions for supporting electrochemical reactions at the metal fuel electrode and the oxidant electrode,
   wherein the oxidant electrode and the metal fuel electrode are each configured in annular form, and wherein the metal fuel electrode and the oxidant electrode are nested.

2. The electrochemical metal-air cell according to claim 1, wherein the metal fuel electrode and the oxidant electrode are essentially cylindrical.

3. The electrochemical metal-air cell according to claim 1, further comprising an oxygen evolution electrode, wherein the oxygen evolution electrode is configured in annular form and wherein the oxygen evolution electrode is provided between the metal fuel electrode and the oxidant electrode.

4. The electrochemical metal-air cell according to claim 1, further comprising a cell housing configured to contain the oxidant electrode, the metal fuel electrode, and the ionically conductive medium therein.

5. The electrochemical metal-air cell according to claim 4, wherein the cell housing is cylindrical.

6. The electrochemical metal-air cell according to claim 1, wherein the oxidant electrode is nested within the metal fuel electrode.

7. The electrochemical metal-air cell according to claim 1, wherein the metal fuel electrode is nested within the oxidant electrode.

8. The electrochemical metal-air cell according to claim 7, wherein the oxidant electrode is a first oxidant electrode, and wherein the cell further comprises a second oxidant electrode, the second oxidant electrode being in annular form and nested within the metal fuel electrode, and wherein the liquid ionically conductive medium is contained between the first oxidant electrode and the second oxidant electrode.

9. The electrochemical metal-air cell according to claim 8, wherein the second oxidant electrode forms an inner air space to contain air therein.

10. The electrochemical metal-air cell according to claim 8, further comprising an oxygen evolution electrode, wherein the oxygen evolution electrode is configured in annular form and wherein the oxygen evolution electrode is provided between the first oxidant electrode and the second oxidant electrode.

11. The electrochemical metal-air cell according to claim 1, wherein the metal fuel electrode comprises a series of permeable bodies, wherein the series of permeable bodies are configured in annular form and wherein each permeable body is spaced apart relative to an adjacent permeable body.

12. The electrochemical metal-air cell according to claim 11, further comprising an oxygen evolution electrode, wherein the oxygen evolution electrode is configured in annular form and wherein the oxygen evolution electrode is provided between the series of permeable bodies of the metal fuel electrode and the oxidant electrode.

13. A system comprising:
    a sealed container;
    a plurality of electrochemical metal-air cells, each metal-air cell comprising:
       an oxidant electrode for absorbing gaseous oxidant and comprising one or more active materials for reducing the gaseous oxidant,
       a metal fuel electrode comprising a solid metal fuel for oxidation, the oxidant electrode and the metal fuel electrode each configured in annular form, wherein the oxidant electrode and the metal fuel electrode are nested; and
       a liquid ionically conductive medium for conducting ions for supporting electrochemical reactions at the metal fuel electrode and the oxidant electrode,
       wherein the sealed container contains the plurality of electrochemical metal-air cells therein.

14. The system according to claim 13, wherein the metal fuel electrode and the oxidant electrode are essentially cylindrical.

15. The system according to claim 13, further comprising an oxygen evolution electrode, wherein the oxygen evolution electrode is configured in annular form and wherein the oxygen evolution electrode is provided between the metal fuel electrode and the oxidant electrode.

16. The system according to claim 13, wherein the metal fuel electrode is nested within the oxidant electrode in each of the plurality of electrochemical cells.

17. The system according to claim 16, wherein the liquid ionically conductive medium is contained by the oxidant electrode of each metal-air cell and wherein the sealed container further contains air therein to surround the plurality of electrochemical metal-air cells.

18. The system according to claim 17, further comprising an air flow generator configured to force atmospheric air into the sealed container, to deliver atmospheric air into the sealed container such that said air is delivered to an external surface of the oxidant electrodes of the plurality of electrochemical metal-air cells contained therein.

19. The system according to claim 13, wherein the plurality of electrochemical metal-air cells are spaced within the sealed container such that centers of the metal-air cells are substantially equidistantly spaced relative to one another.

20. The system according to claim 13, wherein the oxidant electrode is nested within the metal fuel electrode in each of the plurality of electrochemical cells, and wherein each oxidant electrode forms an inner air space to contain air therein.

21. The system according to claim 20, wherein the liquid ionically conductive medium is contained by the sealed container and wherein the oxidant electrodes of the plurality of electrochemical metal-air cells are suspended within the sealed container such that the oxidant electrodes are configured to substantially float within the ionically conductive medium.

22. The system according to claim 13, wherein the metal fuel electrode comprises a series of permeable bodies, wherein the series of permeable bodies are configured in annular form and wherein each permeable body is spaced apart relative to an adjacent permeable body.

23. The system according to claim 22, further comprising an oxygen evolution electrode, wherein the oxygen evolution electrode is configured in annular form and wherein the oxygen evolution electrode is provided between the series of permeable bodies of the metal fuel electrode and the oxidant electrode.

24. The system according to claim 13, wherein each of the electrochemical metal-air cells comprises a cell housing configured to contain the oxidant electrode, the metal fuel electrode, and the ionically conductive medium therein.

25. The electrochemical metal-air cell of claim 1, wherein the cell is configured to generate current by oxidation of the solid metal fuel at the metal fuel electrode and reduction of the gaseous oxidant at the oxidant electrode.

26. The electrochemical metal-air cell of claim 3, wherein the cell is configured to generate current by oxidation of the solid metal fuel at the metal fuel electrode and reduction of the gaseous oxidant at the oxidant electrode, and wherein the cell is a secondary cell and configured to be recharged by application of a current to cause oxidation to evolve oxygen at the oxygen evolution electrode and reduction of the solid metal fuel at the metal fuel electrode.

* * * * *